(12) United States Patent
Sumimoto

(10) Patent No.: US 7,486,052 B2
(45) Date of Patent: Feb. 3, 2009

(54) CONTROLLER FOR VEHICLE AC GENERATOR

(75) Inventor: Katsuyuki Sumimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 11/783,171

(22) Filed: Apr. 6, 2007

(65) Prior Publication Data
US 2008/0106240 A1  May 8, 2008

(30) Foreign Application Priority Data
Nov. 8, 2006 (JP) .............................. 2006-302839

(51) Int. Cl.
H02H 7/06 (2006.01)
H02P 11/00 (2006.01)
H02P 9/00 (2006.01)
(52) U.S. Cl. .......................................... 322/24; 322/28
(58) Field of Classification Search .................. 322/24, 322/26, 28, 44, 59; 363/91; 307/10.1
See application file for complete search history.

(56) References Cited

U.S. PATENT DOCUMENTS

| 4,143,313 | A * | 3/1979 | Arendt | 322/28 |
| 6,734,653 | B2 * | 5/2004 | Taniguchi et al. | 322/24 |
| 7,224,144 | B2 * | 5/2007 | Inokuchi et al. | 322/24 |
| 7,245,111 | B2 * | 7/2007 | Montgomery et al. | 322/45 |
| 7,265,463 | B2 * | 9/2007 | Kusase et al. | 310/62 |
| 7,292,007 | B2 * | 11/2007 | Aoyama | 322/24 |
| 7,330,015 | B2 * | 2/2008 | Takase et al. | 322/28 |
| 2005/0057226 | A1 * | 3/2005 | Kawakami et al. | 322/24 |
| 2007/0241724 | A1 * | 10/2007 | Asada | 322/28 |

FOREIGN PATENT DOCUMENTS

| JP | 5136680 A | 6/1993 |
| JP | 2002-95297 A | 3/2002 |
| JP | 2004194395 A | 7/2004 |

* cited by examiner

Primary Examiner—Julio Gonzalez
(74) Attorney, Agent, or Firm—Sughrue Mion, PLLC

(57) ABSTRACT

A controller for a vehicle AC generator that allows the aging test time of a CMOS logic circuit to be reduced is provided. The controller includes a specified signal detecting circuit connected to a third external terminal to detect a specified signal, a voltage selector circuit that generates a voltage selector signal in response to the detection output of the specified signal detecting circuit, and a power supply circuit connected to the first external terminal to output, as internal power supply voltage, first power supply voltage in a first state in which the specified signal is not input to the third external terminal and second power supply voltage higher than the first power supply voltage in a second state in which the specified signal is input to the third external terminal.

10 Claims, 7 Drawing Sheets

CONTROLLER FOR VEHICLE AC GENERATOR

BACKGROUND OF THE INVENTION

1. Field of the Invention

The invention relates to a controller for a vehicle AC generator for use in a vehicle.

2. Description of the Related Art

A controller for a vehicle AC generator of this kind controls the on/off state of field current passed through a field coil in response to the voltage of the vehicle AC generator and controls the generator voltage of the vehicle AC generator. A voltage controller disclosed by JP2002-95297A includes switch means that controls field current, a control circuit that controls the on/off state of the switch means in response to the voltage of the generator, a power supply circuit for the control circuit, and a voltage controller having a power supply driving circuit that drives the power supply circuit.

A semiconductor integrated circuit is generally used for such a controller for a vehicle AC generator, and for achieving reduced power consumption, a CMOS logic circuit as a CMOS semiconductor integrated circuit is used. The CMOS logic circuit is a complementary MOS integrated circuit including a P-channel MOS transistor and an N-channel MOS transistor. The controller for the vehicle AC generator using such a CMOS logic circuit must be examined for the operation of the CMOS logic circuit in an initial test before its actual operation, and in the initial test, long aging time is necessary in order to detect initial failures in the CMOS logic circuit.

The initial test is carried out to test the function of the semiconductor integrated circuit, while a short term function test does not clarify functional failures in the CMOS logic circuit and therefore aging for a long period is necessary. A power supply circuit in a controller for a vehicle AC generator in general is formed to output a signal power supply voltage for example as the power supply circuit disclosed by JP2002-95297A and can output only the single power supply voltage. The power supply voltage is output as a single power supply voltage having the same voltage value when the controller is actually operated or in an initial test state, and therefore the aging time is particularly prolonged in the CMOS logic circuit when the aging is carried out in the initial test.

SUMMARY OF THE INVENTION

The invention provides an improved controller for a vehicle AC generator including a CMOS logic circuit that allows the time required for aging in an initial test to be reduced.

A controller for use in a vehicle AC generator according to the invention has a first external terminal connected to a vehicle battery and supplied with generator voltage from said vehicle AC generator, a second external terminal connected to a field coil in said vehicle AC generator, and a third external terminal selectively input into a specified signal. The controller includes an excitation switch, an excitation control circuit, a specified signal detecting circuit, a voltage selector circuit and a power supply circuit. The excitation switch is connected to the second external terminal to control field current passed through the field coil. The excitation control circuit is connected to the first external terminal to control the on/off state of the excitation switch based on at least one of the battery voltage of the vehicle battery and the generator voltage. The specified signal detecting circuit is connected to the third external terminal to detect the specified signal. The voltage selector circuit generates a voltage selector signal in response to the detection output of the specified signal detecting circuit. The power supply circuit is connected to the first external terminal to output either one of first power supply voltage and second power supply voltage higher than the first power supply voltage as internal power supply voltage, based on the voltage selector signal. The controller is constructed by using a CMOS logic circuit at least as a part thereof. And the power supply circuit outputs the first power supply voltage in a first state in which the specified signal is not input to the third external terminal and the second supply voltage in a second state in which the specified signal is input to the third external terminal, and supplies the internal power supply voltage to at least the CMOS logic circuit.

The controller for use in a vehicle AC generator according to the invention includes the excitation switch connected to the second external terminal to control field current passed through the field coil, the excitation control circuit connected to the first external terminal to control the on/off state of the excitation switch based on the generator voltage, the specified signal detecting circuit connected to the third external terminal to detect a specified signal, the voltage selector circuit that generates a voltage selector signal in response to the detection output of the specified signal detecting circuit, and the power supply circuit connected to the first external terminal to output either one of the first power supply voltage or the second power supply voltage higher than the first power supply voltage as the internal power supply voltage, based on the voltage selector signal, the controller is constructed by using a CMOS logic circuit at least as a part thereof, and the power supply circuit outputs the first supply voltage in a first state in which the specified signal is not input to the third external terminal and the second supply voltage in a second state in which the specified signal is input to the third external terminal and supplies the internal power supply voltage to at least the CMOS logic circuit. In this way, the specified signal is input to the third external terminal when aging is carried out in an initial test, so that the aging time of the CMOS logic circuit can be reduced.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Now, embodiments of the invention will be described in conjunction with the accompanying drawings.

First Embodiment

Figure 1:
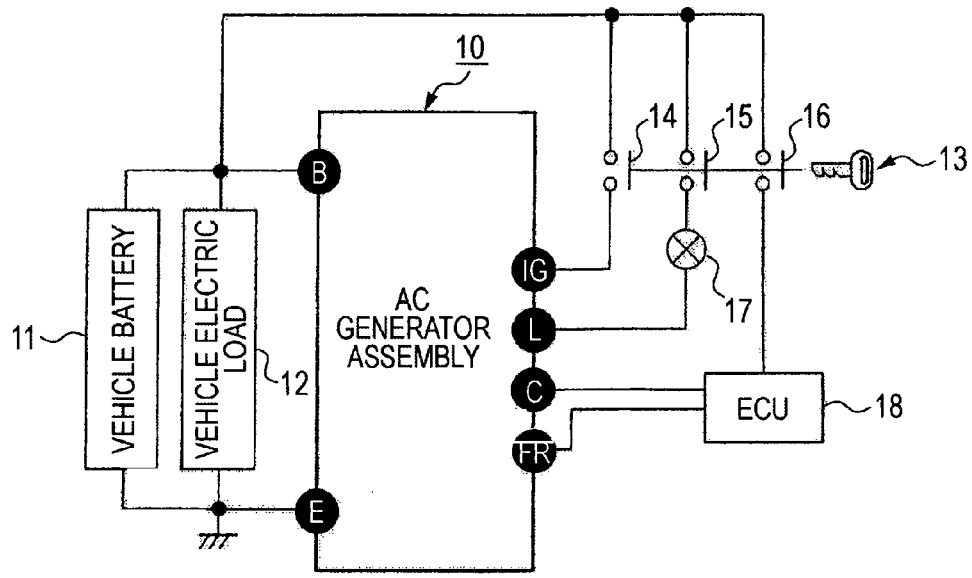
FIG. 1 is a diagram of a general configuration of a vehicle electric system including a controller for a vehicle AC generator according to the invention.
Figure 2:
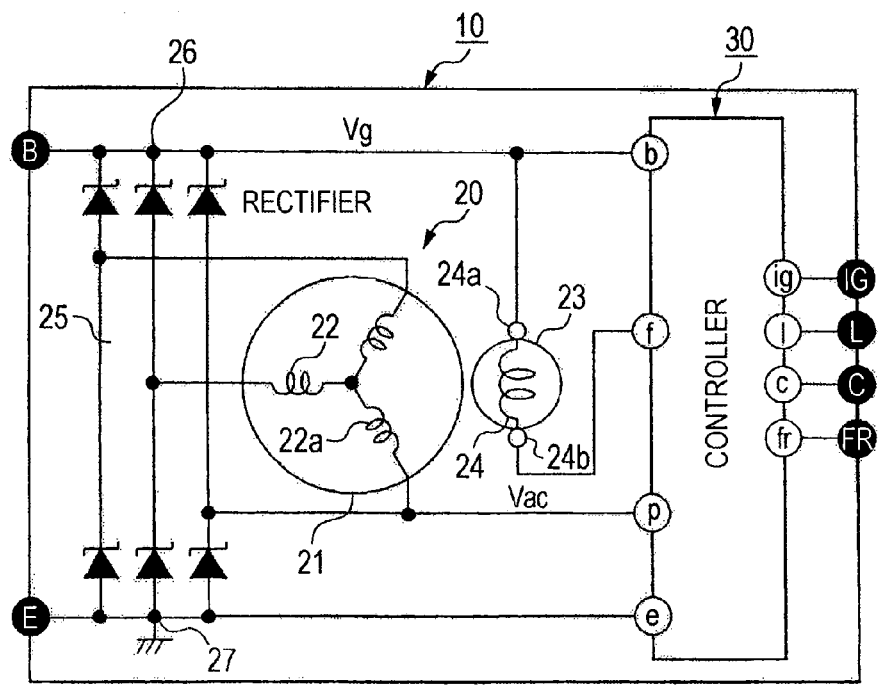
FIG. 2 is an internal circuit diagram of an AC generator assembly including a controller for a vehicle AC generator according to the invention.
Figure 3:
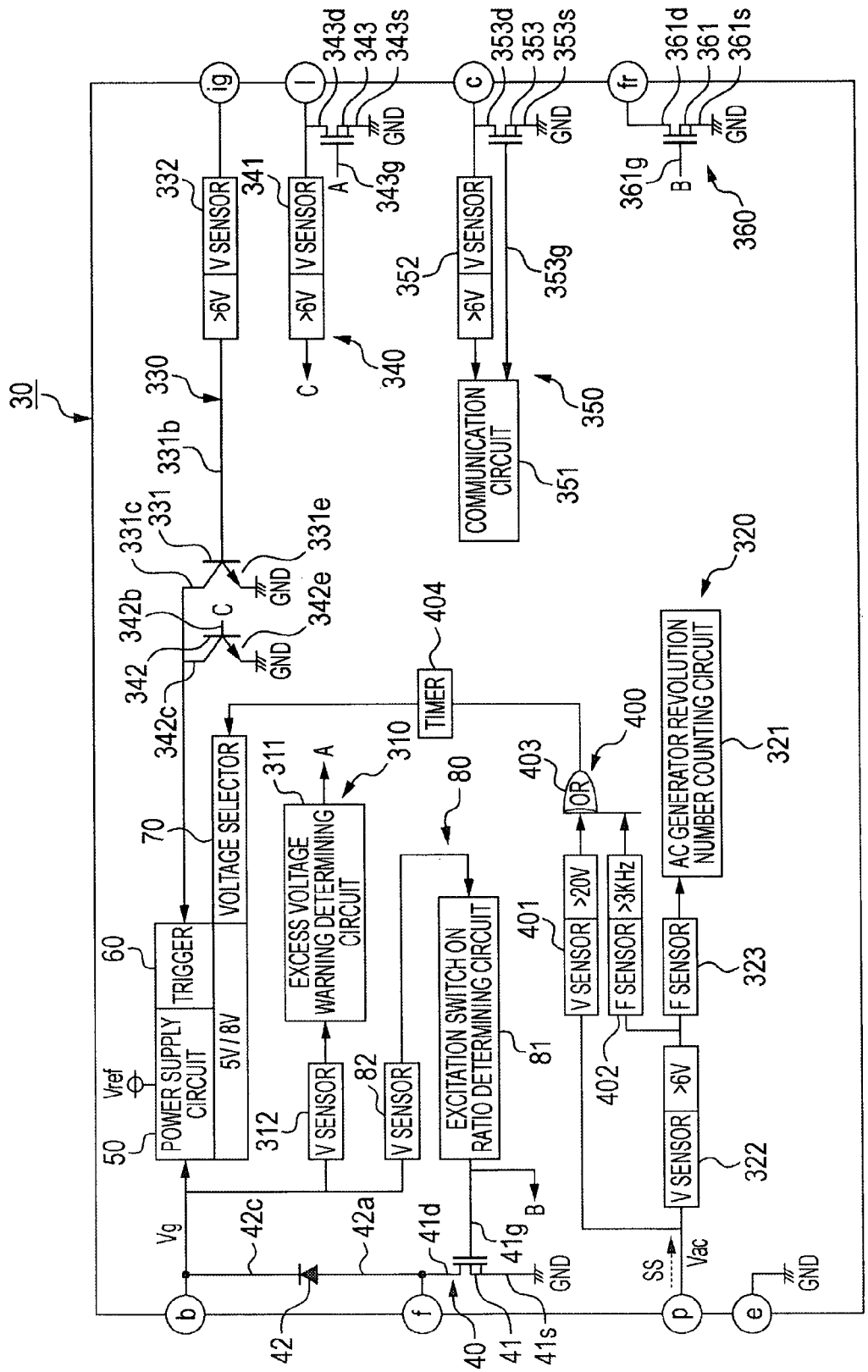
FIG. 3 is a block circuit diagram of a controller for a vehicle AC generator according to a first embodiment of the invention.

FIG. 1 is a diagram of a general configuration of a vehicle electric system including a controller for a vehicle AC generator according to the invention, FIG. 2 is an internal circuit diagram of an AC generator assembly including a controller for a vehicle AC generator according to the invention, and FIG. 3 is a block circuit diagram of a controller for a vehicle AC generator according to a first embodiment of the invention.

The vehicle electric system shown in FIG. 1 includes an AC generator assembly 10, a vehicle battery 11, a vehicle electric load 12, a vehicle ignition switch 13, an abnormality indicator lamp 17, and an engine electronic control unit (ECU) 18. The AC generator assembly 10 has B, E, IG, L, C, and FR terminals. The vehicle battery 11 and the vehicle load 12 are connected between the B and E terminals of the AC generator assembly 10. The vehicle battery 11 is for example a 12-volt battery and has its positive terminal connected to the B terminal of the AC generator assembly 10 and its negative terminal connected to the vehicle body. The vehicle body connection serves as a common ground in the vehicle.

The vehicle electric load 12 includes various electric loads in the vehicle. The vehicle electric load 12 includes an engine starter circuit, an engine ignition circuit, and an engine air ventilation control circuit attached to the engine provided in the vehicle, and an air conditioner and an illumination lamp attached to the vehicle. These kinds of electric loads have their negative terminals connected to the vehicle body and their positive terminals connected to the B terminal of the AC generator assembly 10. The ignition switch 13 includes first, second, and third switches 14, 15, and 16. The first switch 14 is connected between the B and IG terminals of the AC generator assembly 10. The second switch 15 is connected between the B and L terminals of the AC generator assembly 10 in series with the abnormality indicator lamp 17. The third switch 16 is connected between the B terminal of the AC generator assembly 10 and the engine electrical control unit 18. The C and FR terminals of the AC generator assembly 10 are connected to the engine electrical control unit 18.

FIG. 2 shows the internal circuit of the AC generator assembly 10. The AC generator assembly 10 includes an AC generator 20, a rectifying circuit 25, and a controller 30 for the vehicle AC generator. The rectifying circuit 25 and the controller 30 are incorporated in the case of the AC generator 20. The AC generator 20 has a stator 21 and a rotor 23. The AC generator 20 is for example a revolving field type, three-phase AC generator, the stator 21 has a three-phase generation coil 22 connected in a star shape, and the rotor 23 has a field coil 24. The three-phase generation coil 22 is wound around a stator core fixed to the case of the AC generator 20. The field coil 24 is wound around the rotary field core attached to a rotating shaft driven by the engine. The field coil 24 has a positive terminal 24a and a negative terminal 24b, and the positive terminal 24a and the negative terminal 24b are connected to the outside through slip rings. The positive terminal 24a is connected to the B terminal of the AC generator assembly 10.

The rectifying circuit 25 is for example a three-phase full-wave rectifying circuit connected to the three-phase generation coil 22, carries out full-wave rectifying to a three-phase AC output generated at the three-phase generation coil 22, so that rectified generator voltage Vg is generated between the positive side output terminal 26 and the negative side output terminal 27. The generator voltage Vg is adjusted for example in the range from 12 V to 16 V though it changes depending on the engine revolution number or the like. The vehicle battery 11 is charged by the generator voltage Vg and power is supplied to the vehicle electric load 12. The rectifying circuit 25 has its positive side output terminal 26 connected to the B terminal of the AC generator assembly 10 and its negative side output terminal 27 connected to the E terminal and to the vehicle body.

The controller 30 is a controller for a vehicle AC generator according to a first embodiment of the invention. The controller 30 has b, f, e, p, ig, l, c and fr terminals. The b terminal forms a first external terminal of the controller 30 and is directly connected to the B terminal of the AC generator assembly 10. The f terminal forms a second external terminal of the controller 30 and is directly connected to the negative terminal 24b of the field coil 24 of the AC generator 20. The e terminal forms a ground terminal of the controller 30 and is connected to the E terminal of the AC generator assembly 10 and to the vehicle body.

The p, ig, l, c, and fr terminals of the controller 30 each form a third external terminal of the controller 30. The p terminal of the controller 30 is connected to a generation coil 22a for one phase of the three-phase generation coil 22, and the AC voltage component Vac of the generation coil 22a is supplied to the p terminal. The ig, l, c, and fr terminals of the controllers 30 are directly connected to the IG, L, C, and FR terminals of the AC generator assembly 10, respectively.

FIG. 3 shows the internal configuration of the controller 30. The controller 30 includes an internal ground GND, an excitation circuit 40, a power supply circuit 50, a power supply trigger circuit 60, a voltage selector circuit 70, an excitation control circuit 80, various functional circuits 310, 320, 330, 340, 350, and 360, and a specified signal detecting circuit 400. The internal ground GND is a ground circuit connected to the e terminal and extended in the controller 30. The internal ground GND is connected to the vehicle body through The e terminal and grounded to the vehicle body. The excitation circuit 40, the power supply trigger circuit 60, the excitation control circuit 80, and the various functional circuits 310, 320, 330, 340, 350, and 360 are known conventional circuits, and the controller 30 according to the first embodiment is particularly characterized by the power supply circuit 50, the voltage selector circuit 70, and the specified signal detecting circuit 400.

The excitation circuit 40 is connected to the b and f terminals of the controller 30. The excitation circuit 40 includes an excitation switch 41 and a flywheel diode 42. The excitation switch 41 is a power semiconductor switch and made for example of a power MOSFET. The excitation switch 41 is connected between the f terminal and the internal ground GND. The excitation switch 41 has main terminals 41d and 41s and a control terminal 41g. The main terminal 41d is for example the drain of the power MOSFET and directly connected to the f terminal. The main terminal 41s is its source and directly connected to the internal ground GND. The excitation switch 41 is connected in series with the field coil 24 of the AC generator 20 through the f terminal, and controls the on/off state of field current passed through the field coil 24 in response to an excitation control signal B applied to the control terminal 41g. The flywheel diode 42 is connected between the b terminal and the f terminal. The flywheel diode 42 has its anode 42a directly connected to the f terminal and its cathode 42c directly connected to the b terminal. The flywheel diode 42 is connected in parallel with the field coil 24 of the AC generator 20 through the b terminal and the f terminal and absorbs surge voltage generated at the field coil 24 when the field current passed through the field coil 24 is turned off.

The power supply circuit 50 is directly connected to the b terminal of the controller 30 to generate prescribed internal power supply voltage Vref by the generator voltage Vg supplied to the b terminal. More specifically, the power supply circuit 50 can selectively output first power supply voltage V1 and second power supply voltage V2 higher than the first power supply voltage V1 as the internal power supply voltage Vref. The first power supply voltage V1 is prescribed voltage such as 5 V DC voltage. The second power supply voltage V2 is prescribed voltage such as 8 V DC voltage. The first or second power supply voltage V1 or V2 is supplied to the excitation control circuit 80, the various functional circuits 310, 320, 330, 340, 350, and 360, and the specified signal detecting circuit 400 as the internal power supply voltage Vref. The generator voltage Vg varies for example in the range from 12 V to 16 V, the first power supply voltage V1 continues to be at a fixed voltage value of 5 V, and the second power supply voltage V2 continues to be at a fixed voltage value of 8 V.

The power supply circuit 50 is provided with the power supply trigger circuit 60 and the voltage selector circuit 70. The power supply trigger circuit 60 drives the power supply circuit 50. The voltage selector circuit 70 generates a voltage selector signal Vss and controls the power supply circuit 50 to generate either one of the first power supply voltage V1 or the second power supply voltage V2 as the internal power supply voltage Vref in response to the voltage selector signal Vss. The power supply circuit 50 selectively outputs the first power supply voltage V1 or the second power supply voltage V2 in response with the voltage selector signal Vss. The voltage selector signal Vss continues to be at a low level in a first state in which the controller 30 is actually operated, and the power supply circuit 50 is controlled to continue to output the first power supply voltage V1. The voltage selector signal Vss continues to be at a high level in a second state in which the controller 30 is in an initial test state and the power supply circuit 50 is controlled to continue to output the second power supply voltage V2. Note that the power supply circuit 50, the power supply trigger circuit 60, and the voltage selector circuit 70 are made of bipolar semiconductor integrated circuits. The power supply trigger circuit 60 is also provided with the first power supply voltage V1 in the first state and with the second power supply voltage V2 in the second state as the internal power supply voltage Vref.

Figure 4:
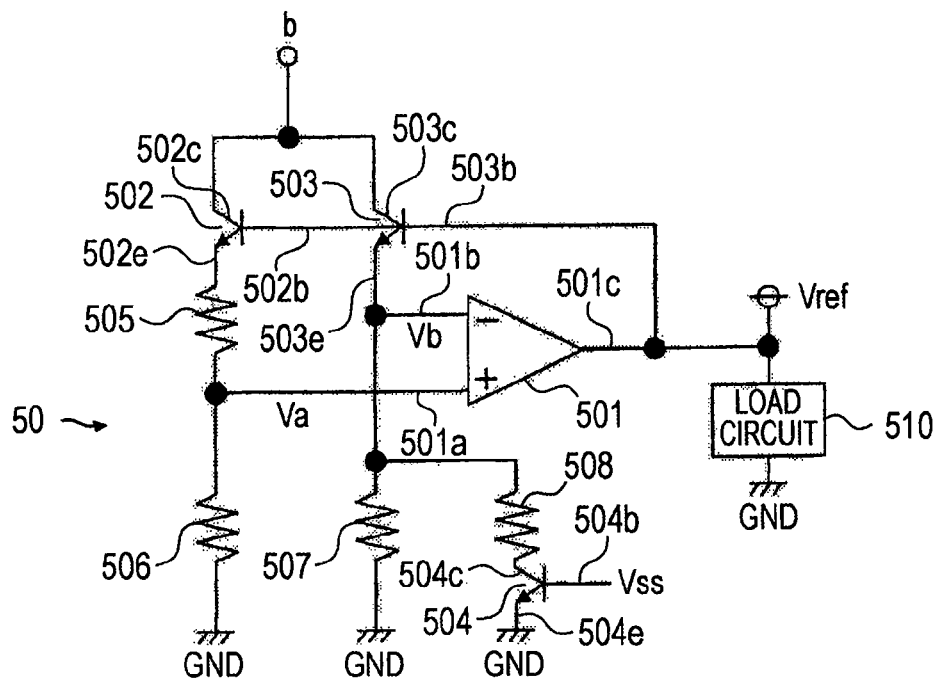
FIG. 4 is an electrical circuit diagram of an example of a power supply circuit according to the first embodiment.

FIG. 4 shows a specific example of the power supply circuit 50. The power supply circuit 50 includes an operational amplifier 501, constant current transistors 502 and 503, a voltage switching transistor 504, and resistors 505, 506, 507, and 508, and generates either one of the first power supply voltage V1 or the second power supply voltage V2 as the internal power supply voltage Vref. The operational amplifier 501 has a positive input 501a, a negative input 501b, and an output 501c. The constant current transistors 502 and 503 are NPN transistors. These constant current transistors 502 and 503 have their collectors 502c and 503c directly connected together to the b terminal of the controller 30, and their bases 502b and 503b connected together to the output 501c of the operational amplifier 501.

The constant current transistor 502 has its emitter 502e connected to the internal ground GND of the controller 30 through the resistors 505 and 506. The constant current transistor 503 has its emitter 503e connected to the internal ground GND through the resistor 507. The voltage switching transistor 504 is an NPN transistor connected to the circuit parallel to the resistor 507 in series with the resistor 508. The voltage switching transistor 504 has its collector 504c connected to the emitter 503e of the constant current transistor 503 through the resistor 508 and its emitter 504e connected to the internal ground GND. The voltage switching transistor 504 is provided with the voltage selector signal Vss from the voltage selector circuit 70 at its base 504b.

The operational amplifier 501 has its positive input 501a connected to the mutual connection point of the resistors 505 and 506 and its negative input 501b connected to the emitter 503e of the constant current transistor 503, and the internal power supply voltage Vref is output to the output 501c. The internal power supply voltage Vref is supplied to a load circuit 510. The load circuit 510 includes the power supply trigger circuit 60, the excitation control circuit 80, the various functional circuits 310, 320, 330, 340, 350, and 360, and the specified signal detecting circuit 400.

The constant current transistors 502 and 503 are provided with the generator voltage Vg from the b terminal of the controller 30. These constant current transistors 502 and 503 are supplied with base current from the output 501c of the operational amplifier 501 to generate constant currents, which are supplied to the resistors 505, 506, and 507. In the first state in which the controller 30 is actually operated, the voltage selector signal Vss continues to be at a low level, and the voltage switching transistor 504 is in an off state. In this state, input voltage Va to the positive input 501a of the operational amplifier 501 is smaller than input voltage Vb to the negative input 501b, in other words, Va<Vb holds, and the operational amplifier 501 generates the first power supply voltage V1 at its output 501c. The first power supply voltage V1 is output from the power supply circuit 50 as the internal power supply voltage Vref. In the second state, in other words, in the initial test state of the controller 30, the voltage selector signal Vss continues to be at a high level, which turns on the voltage switching transistor 504. In the second state, the resistor 508 is connected in parallel with the resistor 507, the input voltage Vb at the operational amplifier 501 is therefore reduced, and Va>Vb holds, so that the operational amplifier 501 generates the second power supply voltage V2 at its output 501c. The second power supply voltage V2 is output from the power supply circuit 50 as the internal power supply voltage Vref.

Figure 5:
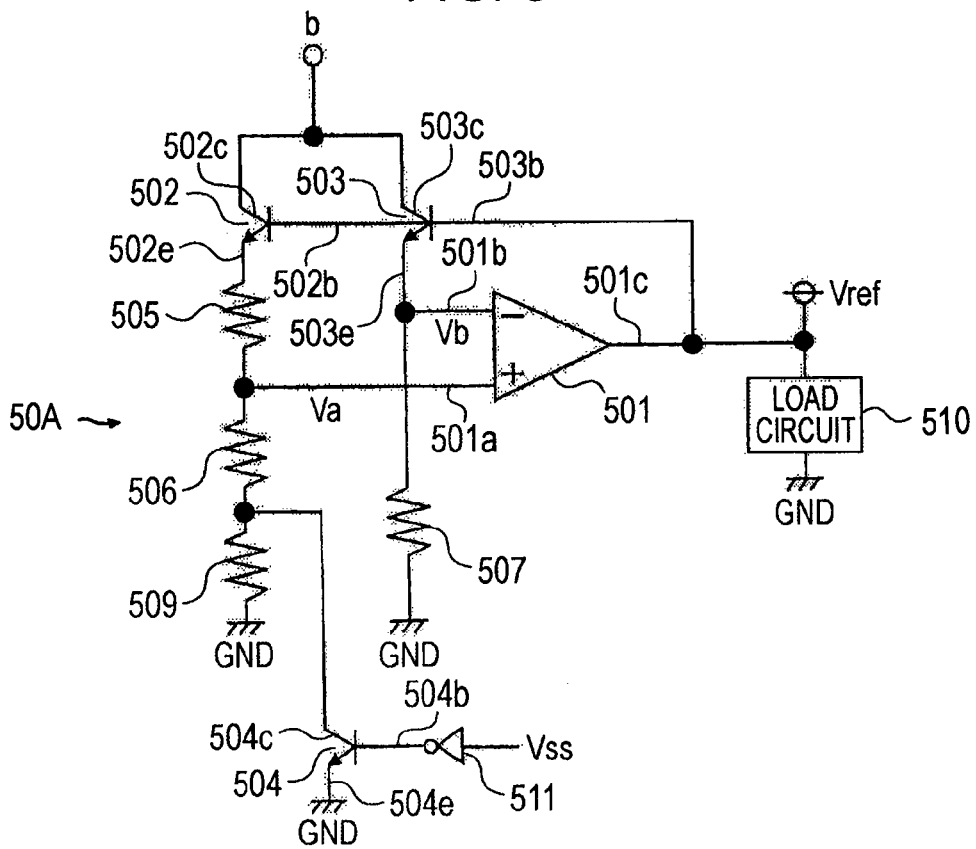
FIG. 5 is an electrical circuit diagram of another example of the power supply circuit according to the first embodiment.

FIG. 5 shows a power supply circuit 50A used in place of the power supply circuit 50. In the power supply circuit 50A, the emitter 502e of the constant current transistor 502 is connected with another resistor 509 in series with the resistors 505 and 506, and the voltage switching transistor 504 is connected in parallel with the resistor 509. Consequently, the voltage selector signal Vss is supplied to the base 504b of the voltage switching transistor 504 through a level inverting circuit 511. The other configuration of the power supply circuit 50A is the same as that of the power supply circuit 50.

In the power supply circuit 50A shown in FIG. 5, in the first state in which the controller 30 is actually operated, the voltage selector signal Vss continues to be at a low level, and the output of the level inverting circuit 511 attains a high level, which turns on the voltage switching transistor 504. In the first state, the input voltage Va at the operational amplifier 501 is smaller than the input voltage Vb, in other words, Va<Vb holds, and the operational amplifier 501 generates the first power supply voltage V1 at its output 501c. The first power supply voltage V1 is output from the power supply circuit 50A as the internal power supply voltage Vref. In the second state in which the controller 30 is in an initial test state, the voltage selector signal Vss continues to be at a high level, and the output of the level inverting circuit 511 attains a low level, which turns off the voltage switching transistor 504. In the second state, Va>Vb holds, and the operational amplifier 501 generates the second power supply voltage V2 at its output 501c. The second power supply voltage V2 is output from the power supply circuit 50A as the internal power supply voltage Vref.

The excitation control circuit 80 connected to the b terminal of the controller 30 includes an excitation switch-on ratio determining circuit 81 as a main element. The excitation control circuit 80 includes a voltage sensor 82 in addition to the excitation switch-on ratio determining circuit 81. The switch-on ratio determining circuit 81 is constructed by using a CMOS logic circuit as a CMOS semiconductor integrated circuit and the voltage sensor 82 is constructed by using a bipolar semiconductor integrated circuit. The excitation switch-on ratio determining circuit 81 and the voltage sensor 82 are supplied with the first power supply voltage V1 or the second power supply voltage V2 from the power supply circuit 50 or 50A as the internal power supply voltage Vref to operate. The switch-on ratio determining circuit 81 is connected to the b terminal of the controller 30 through the voltage sensor 82. The voltage sensor 82 detects the battery voltage of the vehicle battery 11 supplied to the b terminal and the generator voltage Vg, and the switch-on ratio determining circuit 81 determines the on-ratio of the excitation switch 41 in response to changes in the battery voltage and the generator voltage Vg. The switch-on ratio determining circuit 81 supplies the excitation control signal B to the control terminal 41g of the excitation switch 41 based on the determined on ratio, so that the on/off state of the excitation switch 41 is controlled in response to the excitation control signal B, and the generator voltage Vg is adjusted.

The functional circuit 310 connected to the b terminal of the controller 30 includes an excess voltage warning determining circuit 311 as a main element. The functional circuit 310 includes a voltage sensor 312 in addition to the excess voltage warning determining circuit 311. The excess voltage warning determining circuit 311 is constructed by using a CMOS logic circuit as a CMOS semiconductor integrated circuit, and the voltage sensor 312 is constructed by using a bipolar semiconductor integrated circuit. The excess voltage warning determining circuit 311 and the voltage sensor 312 are supplied with the first power supply voltage V1 or the second power supply voltage V2 supplied as internal power supply voltage Vref from the power supply circuit 50 or 50A to operate. The excess voltage warning determining circuit 311 is connected to the b terminal of the controller 30 through the voltage sensor 312. The voltage sensor 312 detects the generator voltage Vg supplied to the b terminal of the controller 30, and the excess voltage warning determining circuit 311 determines that the generator voltage Vg reaches an abnormal value such as 18 V or higher and outputs an abnormality warning signal A as a control signal.

The functional circuit 320 connected to the p terminal of the controller 30 includes an AC generator revolution number counting circuit 321 as a main element. The functional circuit 320 includes a voltage sensor 322 and a frequency sensor 323 in addition to the AC generator revolution number counting circuit 321. The AC generator revolution number counting circuit 321 is constructed by using a CMOS logic circuit as a CMOS semiconductor integrated circuit. The voltage sensor 322 and the frequency sensor 323 are constructed by using bipolar semiconductor integrated circuits. The AC generator revolution number counting circuit 321, the voltage sensor 322 and the frequency sensor 323 are supplied with the first power supply voltage V1 or the second power supply voltage V2 as the internal power supply voltage Vref from the power supply circuit 50 or 50A to operate. The AC generator revolution number counting circuit 321 is connected to the p terminal of the controller 30 through the frequency sensor 323 and the voltage sensor 322. The p terminal is supplied with an AC voltage component Vac as a control signal from the generation coil 22a for one phase of the three-phase generation coil 22 of the AC generator 20. The voltage sensor 322 detects an AC voltage component vac for example equal to or higher than a threshold such as 6 V and the frequency sensor 323 detects the frequency of the AC voltage component Vac. The AC generator revolution number counting circuit 321 counts the number of driven revolutions of the AC generator 20 based on the output of the frequency sensor 323.

The functional circuit 330 connected to the ig terminal of the controller 30 includes a driving control switch 331 and a voltage sensor 332. The driving control switch 331 and the voltage sensor 332 are constructed by using bipolar semiconductor integrated circuits. The driving control switch 311 is for example an NPN transistor and has its collector 331c connected to the power supply trigger circuit 60 and its emitter 331e directly connected to the internal ground GND. The voltage sensor 332 is connected to the ig terminal of the controller 30 and the ig terminal is supplied with a signal representing the on/off state of the first switch 14 of the ignition switch 13 as a control signal. The voltage sensor 332 is supplied with the first power supply voltage V1 or the second power supply voltage V2 as the internal power supply voltage Vref from the power supply circuit 50 or 50A to operate. The voltage sensor 332 detects voltage equal to or higher than a threshold such as 6 V and detects the turning on of the first switch 14 of the ignition switch 13. When the first switch 14 of the ignition switch 13 is turned on, the voltage sensor 332 raises the base potential of the base 331b of the driving control switch 331 to a high level and supplies a driving signal to the power supply trigger circuit 60 by the driving control switch 331.

The functional circuit 340 connected to the l terminal of the controller 30 includes a voltage sensor 341, a driving control switch 342, and a control switch 343. The voltage sensor 341 and the driving control switch 342 are constructed by using bipolar semiconductor integrated circuits, and the control switch 343 is constructed by using an MOSFET. The driving control switch 342 is for example an NPN transistor and has its collector 342c connected to the power supply trigger circuit 60 and its emitter 342e directly connected to the internal ground GND. The voltage sensor 341 is connected to the l terminal of the controller 30, and the l terminal is supplied with a signal representing the on/off state of the second switch 15 of the ignition switch 13 as a control signal through the abnormality indicator lamp 17. The voltage sensor 341 is supplied with the first power supply voltage V1 or the second power supply voltage V2 as the internal power supply voltage Vref from the power supply circuit 50 or 50A to operate. The voltage sensor 341 detects voltage equal to or higher than a threshold such as 6 V and detects the turning on of the second switch 15 of the ignition switch 13. The voltage sensor 341 generates a second switch-on signal C when the second switch 15 of the ignition switch 13 is turned on and the base potential of the base 341b of the driving control switch 342 is raised to a high level in response to the second switch-on signal C, so that a driving signal is supplied to the power supply trigger circuit 60 by the driving control switch 342.

The control switch 343 is connected between the l terminal of the controller 30 and the internal ground GND. The control switch 343 is for example constructed by using an MOSFET and has its drain 343d directly connected to the l terminal and its source 343s directly connected to the internal ground GND. The gate 343g of the control switch 343 is supplied with an abnormality warning output A from the excess voltage warning determining circuit 311 of the functional circuit 310 as a control signal. The control switch 343 is connected in series with the abnormality indicator lamp 17 and turns on the abnormality indicator lamp 17 when the generator voltage Vg reaches an abnormal value. Note that when the control switch 343 turns on, the voltage at the l terminal of the controller 30 drops to a level equal to or lower than 6 V, and therefore the control switch 342 is turned off.

The functional circuit 350 connected to the c terminal of the controller 30 includes a communication circuit 351 as a main element. The functional circuit 350 includes a voltage sensor 352 and a control switch 353 in addition to the communication circuit 351. The communication circuit 351 is constructed by using a CMOS logic circuit as a CMOS semiconductor integrated circuit, the voltage sensor 352 is constructed by using a bipolar semiconductor integrated circuit and the control circuit 353 is constructed by using an MOSFET. The communication circuit 351 and the voltage sensor 352 are supplied with the first power supply voltage V1 or the second power supply voltage V2 as the internal power supply voltage Vref from the power supply circuit 50 or 50A to operate. The communication circuit 351 is connected to the c terminal of the controller 30 through the voltage sensor 352 and the control switch 353 and exchanges control signals with the engine electronic control unit 18 through the c terminal.

The communication circuit 351 is connected to the c terminal through the voltage sensor 352 and receives a signal from the engine electronic control unit 18. The voltage sensor 352 determines the level of the received signal supplied to the c terminal from the engine electronic control unit 18 and inputs the signal to the communication circuit 351. The voltage sensor 352 determines the signal received at the c terminal as a high level signal if the signal is for example at 6 V or higher and as a low level signal if the signal is at less than 6 V and inputs the signal to the communication circuit 351. The control switch 353 has its drain 353d directly connected to the c terminal of the controller 30 and its source 353s directly connected to the internal ground GND. The control switch 353 has its gate 353g connected to the communication circuit 351. The control switch 353 supplies the signal transmitted from the communication circuit 351 to the engine electronic control unit 18 through the c terminal. The control switch 353 is controlled to be turned on/off in response to the transmission signal from the communication circuit 351. If the transmission signal of the communication circuit 351 is a high level signal, the control switch 353 is turned on, and if the signal is a low level signal, the control switch 353 is turned off. The transmission signal of the communication circuit 351 is transmitted to the engine electronic control unit 18 through the c terminal based on the on/off operation of the control switch 353.

The functional circuit 360 connected to the fr terminal of the controller 30 includes a control switch 361. The control switch 361 is constructed by using a MOSFET and has its drain 361d directly connected to the fr terminal and its source 361s directly connected to the ground GND. The gate 361g of the control switch 361 is supplied with the excitation control signal B from the excitation switch-on ratio determining circuit 311 of the excitation control circuit 310. The control switch 361 is controlled to be turned on/off in the same timing as that of the excitation switch 41 and transfers a control signal representing the on ratio of the excitation switch 41 to the engine electronic control unit 18 through the fr terminal.

The specified signal detecting circuit 400 and the functional circuit 320 are connected together to the p terminal of the controller 30 according to the first embodiment. The specified signal detecting circuit 400 includes a voltage sensor 401, a frequency sensor 402, an OR circuit 403, and a timer circuit 404. The voltage sensor 401 and the frequency sensor 402 are constructed by using bipolar semiconductor integrated circuits, and the OR circuit 403 and the timer circuit 404 are each constructed by using a CMOS logic circuit as a CMOS semiconductor integrated circuit. The voltage sensor 401, the frequency sensor 402, the OR circuit 403, and the timer circuit 404 are supplied with the first power supply voltage V1 or the second power supply voltage V2 as the internal power supply voltage Vref from the power supply circuit 50 or 50A to operate.

According to the first embodiment, in the second state in which the controller 30 is in an initial test state, a specified signal SS is input to the p terminal from the outside of the controller 30, and the specified signal detecting signal 400 detects the specified signal SS. The specified signal SS continues to be supplied during the initial test period. The specified signal SS is not input to the p terminal in the state in which the controller 30 is actually operated. The specified signal SS is a special signal that is not used in the controller 30 when the controller 30 is actually operated. More specifically, the specified signal SS is a special signal having a prescribed value such as a voltage value of at least 20 V or a frequency of at least 3 kHz when a 12-volt type vehicle battery 11 is used. The specified signal SS having a voltage value of at least 20 V does not exist at the B terminal of the AC generator assembly 10 and is not input to the controller 30 while the controller 30 is actually operated for example in the vehicle using the 12 V type vehicle battery 11. The generator voltage Vg appearing at the B terminal of the AC generator assembly 10 is produced by carrying out full-wave rectifying to the three phases of the three-phase AC voltage at the three-phase AC generation coil 22 by the rectifying circuit 25 and the voltage includes a ripple. The ripple does not exceed 3 kHz at the maximum number of revolutions of the engine while the controller 30 is actually operated, and therefore the specified signal SS having a frequency of at least 3 kHz is not input to the controller 30 while the controller 30 is actually operated. As a matter of course, the frequency of the AC voltage component Vac of the generation coil 22a for one phase of the three-phase generation coil 22 does not exceed 3 kHz.

The voltage sensor 401 is directly connected to the p terminal of the controller 30 in order to detect the specified signal SS having a voltage value of at least 20 V. The frequency sensor 402 is connected to the p terminal of the controller 30 through the voltage sensor 322 of the functional circuit 320 in order to detect the specified signal SS having a frequency of at least 3 kHz. The voltage sensor 401 continues to be at a high level when the specified signal SS having a voltage value of at least 20 V continues to be input to the p terminal in the second state, i.e., in the initial test state. In the first state in which the specified signal SS is not input, the low level continues. The voltage sensor 322 detects the specified signal SS at least at a threshold such as 6 V, and the frequency sensor 402 continues to be at a high level when the specified signal SS at 6 V or higher continues to be input at a frequency of at least 3 kHz in the second state, i.e., in the initial test state and continues to be at a low level in the first state in which the specified signal SS is not input.

The output of the voltage sensor 401 and the output of the frequency sensor 402 are connected to two inputs of the OR circuit 403. Therefore, the OR circuit 403 outputs a high level output when the specified signal SS having a voltage value of at least 20 V or a frequency of at least 3 kHz continues to be input to the p terminal of the controller 30. The high level output of the OR circuit 403 is input to the voltage selector circuit 70 through the timer circuit 404. The voltage selector circuit 70 controls the power supply circuit 50 or 50A to output the second power supply voltage V2 based on the voltage selector signal Vss as a high level in response to the output of the timer circuit 404.

The timer circuit 404 supplies a high level signal to the voltage selector circuit 70 when the OR circuit 403 outputs a high level output for at least a prescribed period. Since the specified signal SS continues to be supplied in the second state in other words in the initial test state of the controller 30, the voltage selector circuit 70 controls the voltage supply circuit 50 to output the second power supply voltage V2 throughout the initial test period. If a signal having a voltage level of at least 20 V or a frequency of at least 3 kHz is input transiently to the p terminal of the controller 30 while the controller 30 is actually operated, the timer circuit 404 maintains a low level unless the signal input continues for at least the prescribed period and prevents the power supply circuit 50 or 50A from outputting the second power supply voltage V2.

In actual operation, the controller 30 is connected as shown in FIGS. 1 and 2. In the actual operation state, when the ignition switch 13 is turned on, a voltage of at least 6 V is supplied to the ig and l terminals of the controller 30, the driving control switches 331 and 342 are turned on, and the power supply circuit 50 is driven through the power supply trigger circuit 60. In the actual operation state of the controller 30, the voltage selector signal Vss continues to be at a low level, and therefore the power supply circuit 50 or 50A continues to output the first power supply voltage V1, so that the first power supply voltage V1 is supplied to the excitation control circuit 80, the functional circuits 310, 320, 330, 340, 350, and 360, and the specified signal detecting circuit 400. The excitation control circuit 80 and the functional circuits 310, 320, 330, 340, 350, and 360 carry out prescribed operation.

In an initial test state, the controller 30 is connected to the AC generator assembly 10, the vehicle battery 11, the ignition switch 13, the abnormality indicator lamp 17, and the engine electronic control unit 18 similarly to the state shown in FIGS. 1 and 2. In the initial test state, when the ignition switch 13 is turned on, a voltage of at least 6 V is supplied to the ig and l terminals of the controller 30, and the driving control switches 331 and 342 are turned on, so that the power supply circuit 50 is driven through the power supply trigger circuit 60. In the initial test of the controller 30, the specified signal SS continues to be supplied to the p terminal of the controller 30 throughout the initial test period. The specified signal SS is detected by the specified signal detecting circuit 400 and the voltage selector circuit 70 controls the power supply circuit 50 to continue to output the second power supply voltage V2.

The power supply circuit 50 continues to output the second power supply voltage V2 throughout the initial test period, and the second power supply voltage V2 is supplied to the excitation control circuit 80, the functional circuits 310, 320, 330, 340, 350, and 360, and the specified signal detecting circuit 400 as the internal power supply voltage Vref. The excitation control circuit 80 and the functional circuits 310, 320, 330, 340, 350, and 360 carry out prescribed operation while an aging test is executed. In the initial test, the second power supply voltage V2 applied to the excitation switch-on ratio determining circuit 81, the excess voltage warning determining circuit 311, the AC generator revolution number counting circuit 321, the communication circuit 351, the OR circuit 403, and the timer circuit 404 made of CMOS logic circuits in particular effectively reduce the aging time of the CMOS logic circuits.

Only one of the voltage sensor 401 and the frequency sensor 402 of the specified signal detecting circuit 400 may be used. In this case, the OR circuit 403 may be omitted. If the voltage sensor 401 is used, the specified signal SS having a special voltage value of at least 20 V is input to the p terminal, and if the frequency sensor 402 is used, the specified signal SS having a special frequency of at least 3 kHz is input to the p terminal.

In this way, according to the first embodiment, the specified signal SS input to the p terminal of the controller 30 is detected by the specified signal detecting circuit 400, and the voltage selector circuit 70 controls the power supply circuit 50 to generate the second power supply voltage V2 based on the specified signal SS, and therefore the aging time of the circuits constructed by CMOS logic circuits can easily be reduced by inputting the specified signal SS to the p terminal in the initial test state.

Second Embodiment

Figure 6:
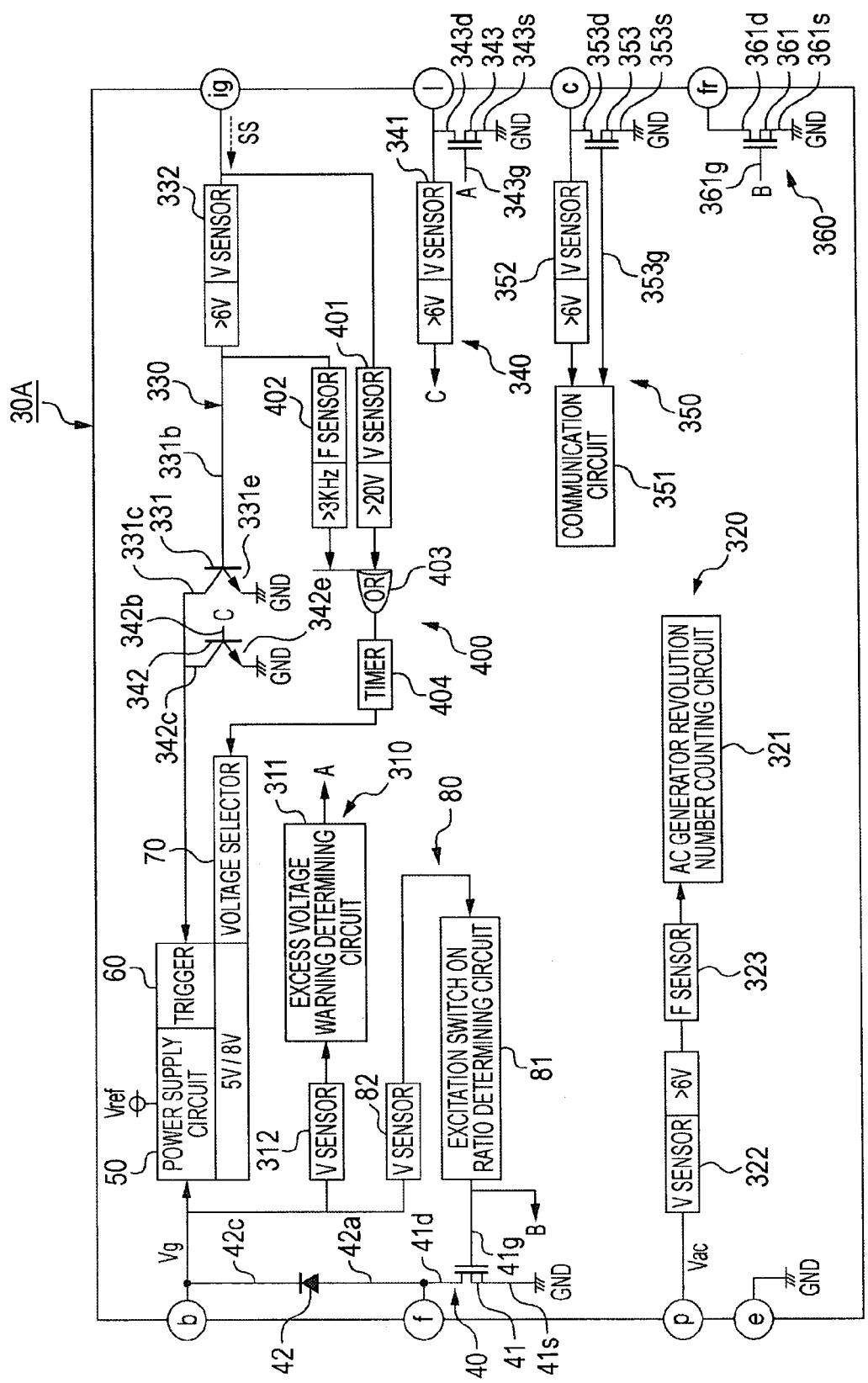
FIG. 6 is a block circuit diagram of a controller for a vehicle AC generator according to a second embodiment of the invention.

FIG. 6 is a block circuit diagram of a controller for a vehicle AC generator according to a second embodiment of the invention. According to the second embodiment, a controller 30A shown in FIG. 6 is used in place of the controller 30 according to the first embodiment. In the controller 30A, the specified signal SS is supplied to the ig terminal of the controller 30A, and the specified signal detecting circuit 400 and the functional circuit 330 are connected together to the ig terminal. The other configuration is the same as that of the controller 30 according to the first embodiment. In the second controller 30A according to the second embodiment, the specified signal detecting circuit 400 the same as that of the first embodiment is used.

In the controller 30A, the voltage sensor 401 of the specified signal detecting circuit 400 is directly connected to the ig terminal of the controller 30A, and the frequency sensor 402 of the specified signal detecting circuit 400 is connected to the ig terminal through the voltage sensor 332 of the functional circuit 330. According to the second embodiment, the specified signal SS continues to be input to the ig terminal in the initial test state of the controller 30A. The specified signal SS is not input to the ig terminal while the controller 30A is actually operated. The specified signal SS is detected by the specified signal detecting circuit 400, and the voltage selector circuit 70 controls the power supply circuit 50 to continue to generate the second power supply voltage V2 throughout the initial test period based on the specified signal SS. Therefore, according to the second embodiment, the aging time of the circuits constructed by CMOS logic circuits can easily be reduced by inputting the specified signal SS to the ig terminal in the initial test state of the controller 30A.

Note that according to the second embodiment, while the controller 30A is actually operated, the control signal at the ig terminal is a signal representing the on/off state of the first switch 14 of the ignition switch 13, and the specified signal SS is not input. If a transient specified signal SS is input, the timer circuit 404 operates to prevent the voltage selector signal Vss from attaining a high level because of the transient signal.

Third Embodiment

Figure 7:
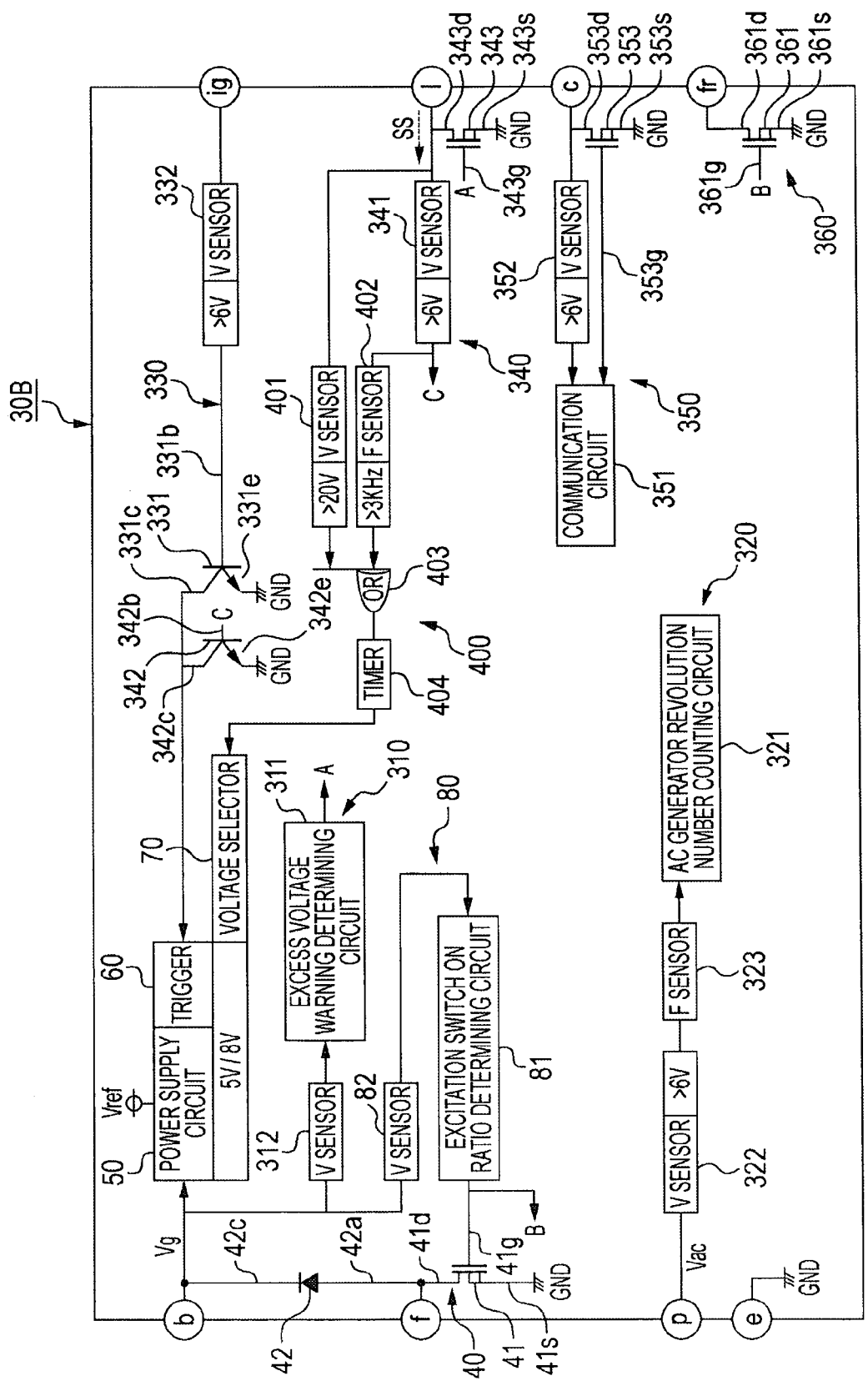
FIG. 7 is a block circuit diagram of a controller for a vehicle AC generator according to a third embodiment of the invention.

FIG. 7 is a block circuit diagram of a controller for a vehicle AC generator according to a third embodiment of the invention. According to the third embodiment, a controller 30B shown in FIG. 7 is used in place of the controller 30 according to the first embodiment. In the controller 30B, the specified signal SS is supplied to the l terminal of the controller 30B, and the specified signal detecting circuit 400 and the functional circuit 340 are connected together to the l terminal. The other configuration is the same as that of the controller 30 according to the first embodiment. In the controller 30B according to the third embodiment, the specified signal detecting circuit 400 the same as that of the first embodiment is used.

In the controller 30B, the voltage sensor 401 of the specified signal detecting circuit 400 is directly connected to the l terminal of the controller 30B and the frequency sensor 402 of the specified signal detecting circuit 400 is connected to the l terminal through the voltage sensor 341 of the functional circuit 340. According to the third embodiment, the specified signal SS continues to be input to the l terminal in the initial test state of the controller 30B. The specified signal SS is not input to the l terminal when the controller 30B is actually operated. The specified signal SS is detected by the specified signal detecting circuit 400, and the voltage selector circuit 70 controls the power supply circuit 50 to continue to generate the second power supply voltage V2 throughout the initial test period based on the specified signal SS. Therefore, according to the third embodiment, the aging time of the circuits constructed by CMOS logic circuits can easily be reduced by continuously inputting the specified signal SS to the l terminal in the initial test state of the controller 30B.

Note that according to the third embodiment, while the controller 30B is actually operated, the control signal at the l terminal is a signal representing the on/off state of the first switch 14 of the ignition switch 13 and the abnormality warning signal A, and the specified signal SS is not input. If a transient specified signal SS is input, the timer 404 operates to prevent the voltage selector signal Vss from attaining a high level because of the transient signal.

Fourth Embodiment

Figure 8:
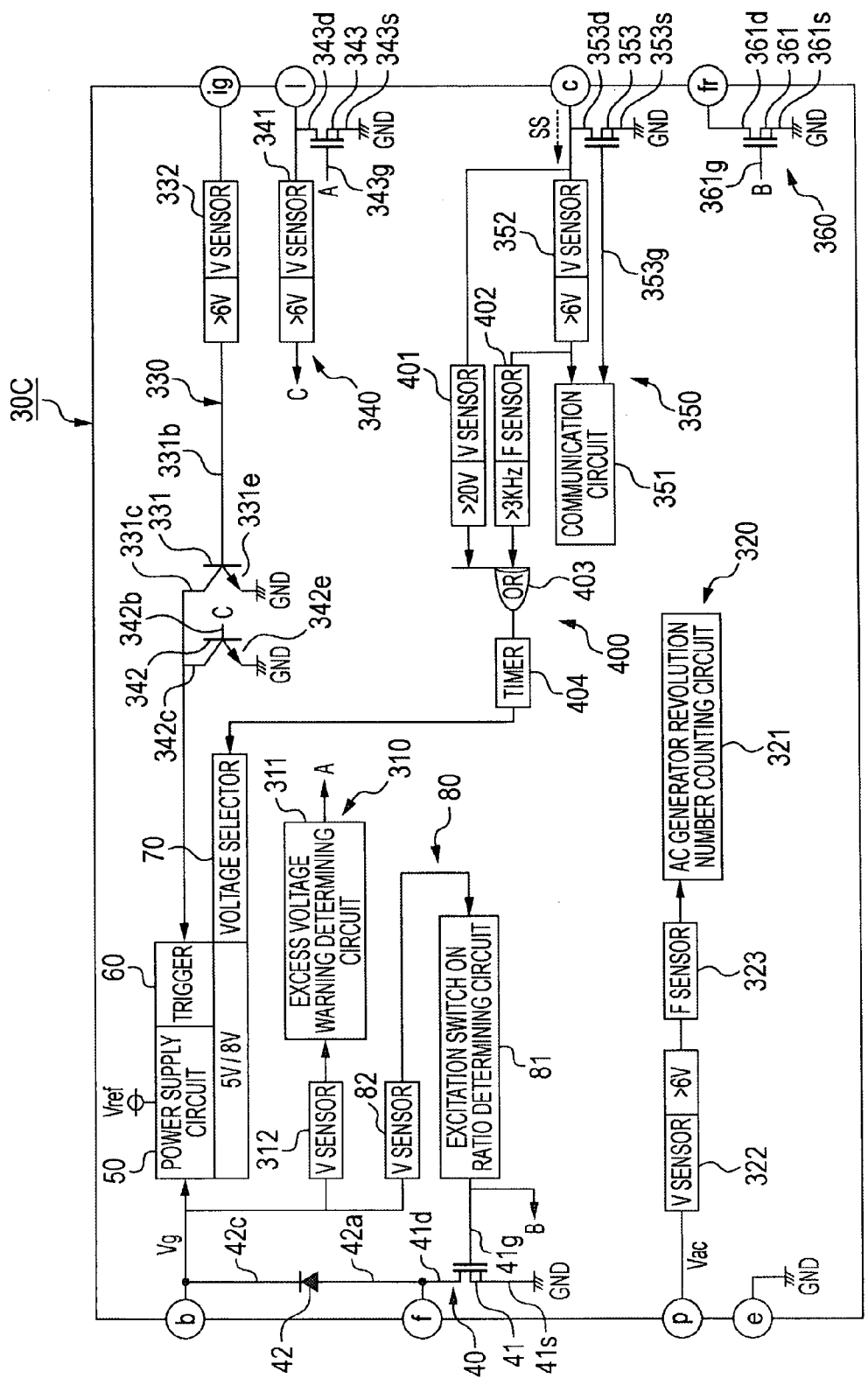
FIG. 8 is a block circuit diagram of a controller for a vehicle AC generator according to a fourth embodiment of the invention.

FIG. 8 is a block circuit diagram of a controller for a vehicle AC generator according to a fourth embodiment of the invention. According to the fourth embodiment, a controller 30C shown in FIG. 8 is used in place of the controller 30 according to the first embodiment. In the controller 30C, the specified signal SS is supplied to the c terminal of the controller 30C, and the specified signal detecting circuit 400 and the functional circuit 350 are connected together to the c terminal. The other configuration is the same of that of the controller 30 according to the first embodiment. In the controller 30C according to the fourth embodiment, the specified signal detecting circuit 400 the same as that of the first embodiment is used.

In the controller 30C, the voltage sensor 401 of the specified signal detecting circuit 400 is directly connected to the c terminal of the controller 30C, and the frequency sensor 402 of the specified signal detecting circuit 400 is connected to the c terminal through the voltage sensor 352 of the functional circuit 350. According to the fourth embodiment, the specified signal SS continues to be input to the c terminal of the controller 30C in the initial test state of the controller 30C. The specified signal SS is not input to the c terminal while the controller 30C is actually operated. The specified signal SS is detected by the specified signal detecting circuit 400, and the voltage selector circuit 70 controls the power supply circuit 50 to continue to generate the second power supply voltage V2 throughout the initial test period based on the specified signal SS. Therefore, according to the fourth embodiment, the aging time of the circuits constructed by CMOS logic circuits can easily be reduced by continuously inputting the specified signal SS to the c terminal in the initial test state of the controller 30C.

Note that according to the fourth embodiment, while the controller 30C is actually operated, the control signal at the c terminal includes a reception signal from the engine control electronic control unit 18 and a transmission signal from the communication circuit 351, and the specified signal SS is not input. If a transient specified signal SS is input, the timer circuit 404 operates to prevent the voltage selector signal Vss from attaining a high level because of the transient signal.

Fifth Embodiment

Figure 9:
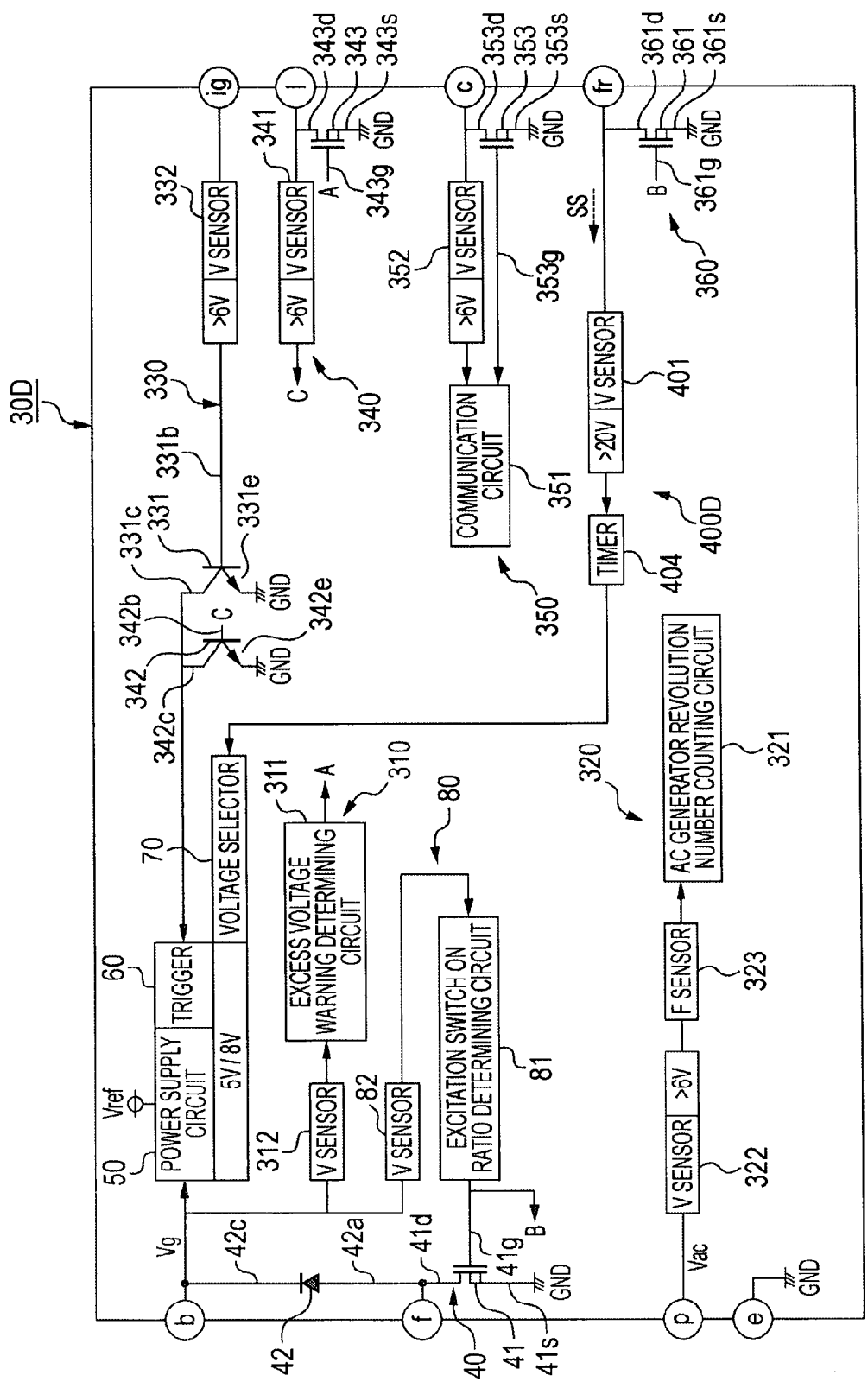
FIG. 9 is a block circuit diagram of a controller for a vehicle AC generator according to a fifth embodiment of the invention.

FIG. 9 is a block circuit diagram of a controller for a vehicle AC generator according to a fifth embodiment of the invention. According to the fifth embodiment, a controller 30D shown in FIG. 9 is used in place of the controller 30 according to the first embodiment. In the controller 30D, the specified signal SS is supplied to the fr terminal of the controller 30D. In the controller 30D, a specified signal detecting circuit 400D is used in place of the specified signal detecting circuit 400 according to the first embodiment. The specified signal detecting circuit 400D and the functional circuit 360 are connected together to the fr terminal. The other configuration is the same as that of the controller 30 according to the first embodiment.

The specified signal detecting circuit 400D includes a voltage sensor 401 and a timer circuit 404, and the frequency sensor 402 and the OR circuit 403 in the specified signal detecting circuit 400 according to the first embodiment are removed. The voltage sensor 401 in the specified signal detecting circuit 400D is directly connected to the fr terminal of the controller 30D. According to the fifth embodiment, the specified signal SS continues to be input to the fr terminal of the controller 30D during the initial test period of the controller 30D. The specified signal SS is not input to the fr terminal while the controller 30D is actually operated. The specified signal SS is detected by the specified signal detecting circuit 400D, and the voltage selector circuit 70 controls the power supply circuit 50 to continue to generate the second power supply voltage V2 based on the specified signal SS. Therefore, according to the fifth embodiment, the aging time of the circuits constructed by CMOS logic circuits can easily be reduced by continuously inputting the specified signal SS having a voltage value of at least 20 V to the fr terminal in the initial test state of the controller 30D.

Note that according to the fifth embodiment, while the controller 30D is actually operated, the control signal at the fr terminal is the excitation control signal B and the specified signal SS is not input. If a transient specified signal SS is input, the timer circuit 404 operates to prevent the voltage selector signal Vss from attaining a high level because of the transient signal.

Other Embodiments

According to the first to fifth embodiments, in the controllers 30 and 30A to 30D, the specified signal detecting circuit 400 or 400D is connected to any one of the p, ig, l, c, and fr terminals to which the functional circuits 320, 330, 340, 350, and 360 are connected, while special terminals used to input the specified signal SS may be provided in the controllers 30 and 30A to 30D other than the b, f, e, p, ig, l, c, and fr terminals. In this case, the specified signal SS continues to be input in the initial test state but is not input in an actual operation state. As is the case with the first to fifth embodiments, the aging test time of the circuits constructed by CMOS logic circuits can be reduced.

The power supply circuit 50 or 50A selectively generates the first power supply voltage V1 and the second power supply voltage V2, while a power supply circuit including a first power supply circuit that generates the first power supply voltage V1 and a second power supply circuit that generates the second power supply voltage V2 may be provided and the voltage selector circuit 70 may select the output voltage of one of the first and second power supply circuits, so that the first power supply voltage V1 and the second power supply voltage V2 may selectively be output.

The power supply circuit 50 or 50A commonly supplies power to a circuit made of a CMOS semiconductor circuit and a circuit made of a bipolar semiconductor integrated circuit in the controller 30, while separate power supply circuits may be provided for these circuits. In this case, at least a power supply circuit for the circuit made of a CMOS semiconductor integrated circuit is allowed to selectively output the first or second power supply voltage V1 or V2 and output the second power supply voltage V2 when the specified signal SS is input.

It should be understood that various modifications and variations of the invention may be achieved by a person skilled in the art without departing from the scope and sprit of the invention and that the invention is not limited to the embodiments described above.

The controller for a vehicle AC generator according to the invention is applicable as a controller for an AC generator provided in various kinds of vehicles such as an automobile.

What is claimed is:

1. A controller for a vehicle AC generator having a first external terminal connected to a vehicle battery and supplied with generator voltage from said vehicle AC generator, a second external terminal connected to a field coil in said vehicle AC generator, and a third external terminal selectively input into a specified signal, wherein
said controller comprises:
an excitation switch connected to the second external terminal to control field current passed through the field coil;
an excitation control circuit connected to the first external terminal to control the on/off state of the excitation switch based on at least one of the battery voltage of said vehicle battery and the generator voltage;
a specified signal detecting circuit connected to the third external terminal to detect the specified signal;
a voltage selector circuit that generates a voltage selector signal in response to the detection output of the specified signal detecting circuit; and
a power supply circuit connected to the first external terminal to output either one of first power supply voltage or second power supply voltage higher than the first power supply voltage as internal power supply voltage, based on the voltage selector signal,
said controller is constructed by using a CMOS logic circuit at least as a part thereof,
the power supply circuit outputs the first power supply voltage in a first state in which the specified signal is not input to the third external terminal and the second power supply voltage in a second state in which the specified signal is input to the third external terminal, and supplies the internal power supply voltage to at least the CMOS logic circuit.

2. The controller for a vehicle AC generator according to claim 1, wherein the third external terminal is further connected with a functional circuit disposed in said controller, and
the functional circuit carries out a prescribed function through the third external terminal by using a control signal different from the specified signal.

3. The controller for a vehicle AC generator according to claim 2, wherein the third external terminal is supplied with an AC voltage component from said vehicle AC generator as the control signal, and
the functional circuit detects the number of revolutions of said vehicle AC generator based on the AC voltage component.

4. The controller for a vehicle AC generator according to claim 2, wherein the third external terminal is supplied with a signal from an ignition switch in the vehicle indicating the on/state of the ignition switch as the control signal, and
the functional circuit detects the on state of the ignition switch.

5. The controller for a vehicle AC generator according to claim 2, wherein the third external terminal is supplied with an abnormality warning signal from said controller as the control signal, and
the functional circuit operates in response to the abnormality warning signal.

6. The controller for a vehicle AC generator according to claim 2, wherein the third external terminal is connected to an electronic control unit that controls an engine provided in the vehicle, and
the functional circuit exchanges signals with said electronic control unit.

7. The controller for a vehicle AC generator according to claim 2, wherein the functional circuit generates a signal indicating the on ratio of the excitation switch as the control signal and outputs the signal indicating the on ratio of the excitation switch through the third external terminal.

8. The controller for a vehicle AC generator according to claim 1, wherein the first state corresponds to the actual operation state of said controller and the second state corresponds to the initial test state of said controller.

9. The controller for a vehicle AC generator according to claim 2, wherein the specified signal has a voltage value higher than that of the control signal.

10. The controller for a vehicle AC generator according to claim 2, wherein the specified signal has a frequency higher than that of the control signal.

* * * * *